United States Patent [19]

Takasu et al.

[11] Patent Number: 4,475,815
[45] Date of Patent: Oct. 9, 1984

[54] METHOD AND APPARATUS FOR MEASURING WIDTH OF A SELVAGE RUBBER PORTION EXTENDING IN TRANSVERSAL DIRECTION OF A COATING SHEET

[75] Inventors: Ryo Takasu, Higashiyamato; Susumu Yazaki, Kodaira, both of Japan

[73] Assignee: Bridgestone Tire Company Limited, Tokyo, Japan

[21] Appl. No.: 341,739

[22] Filed: Jan. 22, 1982

[30] Foreign Application Priority Data

Jan. 30, 1981 [JP] Japan ................................. 56-11639

[51] Int. Cl.³ ............................................. G01B 11/04
[52] U.S. Cl. .................................... 356/385; 250/560; 356/429
[58] Field of Search ............... 356/238, 375, 385, 394, 356/429, 430, 431; 250/560, 561, 571

[56] References Cited

U.S. PATENT DOCUMENTS

| T861,053 | 4/1969 | Buckson | 356/238 |
|---|---|---|---|
| 3,588,513 | 6/1971 | Akamatsu et al. | 356/430 |
| 4,308,461 | 12/1981 | Tuomaala | 250/561 |

Primary Examiner—R. A. Rosenberger
Attorney, Agent, or Firm—Sughrue, Mion, Zinn, Macpeak and Seas

[57] ABSTRACT

A width of a selvage rubber portion extending in transversal direction of a coating sheet used for production of tire in which a plurality of cords arranged in substantially the equal interval and in parallel are integrally coated with rubber so that the cord portions are expanded, from the most externally positioned cord portion in said coating sheet, is precisely measured by transferring said coating sheet on a surface of a transferring member having a reflecting property different from that of the above described coating sheet in the longitudinal direction of said cord, emitting a light on a zone including at least the above described transferring member and the most externally positioned cord portion and detecting the light intensity distribution of the light reflected by the above described zone.

6 Claims, 6 Drawing Figures

METHOD AND APPARATUS FOR MEASURING WIDTH OF A SELVAGE RUBBER PORTION EXTENDING IN TRANSVERSAL DIRECTION OF A COATING SHEET

BACKGROUND OF THE INVENTION

The present invention relates to a method and an apparatus for measuring width of a selvage rubber portion extending in transversal direction of a coating sheet wherein a plurality of cords arranged in parallel and in substantially the equal interval are integrally coated with rubber and the like so that the cord portions are expanded, from the most externally positioned cord portion of said coating sheet.

The coating sheet wherein the cord portions are expanded includes, for example, rubber coating sheets embedding reinforcing cords, which are used for production of a tire and the like. This coating sheet is produced by coating a tire cord fabric in which a plurality of cords 1-1, 1-2, ..., 1-n are arranged in parallel and in substantially the equal interval as shown in FIG. 1 with rubber 3 by feeding the fabric into a calender having rolls 2-1, 2-2, 2-3 and 2-4 as shown in FIG. 2 in the longitudinal direction shown by an arrow A. FIG. 3 shows a cross-sectional view of the thus produced coating sheet 4 and the coated portions (cord portions) 5-1, 5-2, ..., 5-n where the cords 1-1, 1-2, ..., 1-n are coated with rubber, are expanded, that is the thickness (diameter) of the coated portions (cord portions) is larger than that of the flat portions 6 connecting the cords. The coating sheet has selvage rubber portions 7 which extend outwardly from the most externally positioned cord portions 5-1 and 5-n respectively in an uneven width. This coating sheet 4 is cut in the given angle and width and the thus cut coating sheets are press-bonded and connected at the selvage rubber portions 7 so that the cord makes the given angle to the longitudinal direction to obtain a long cord inclined fabric. In the thus formed cord inclined fabric, it is a necessary requirement for producing the tires which are high in the drive feeling, and are strong and safe, that the distance between the cords is constant. For the purpose, it is necessary to precisely measure the width of the selvage rubber portions 7 to be press-bonded and connected, and to cut the portions at the given width.

As such methods for measuring the selvage rubber portion, it has been proposed that the position of the most externally positioned cord is detected prior to coating the cords with rubber and the position of the most external end of the coating sheet after rubber coating, that is the end surface of the selvage rubber portion is detected, whereby the width of the selvage rubber portion is measured. When the cord is steel, the position of the most externally positioned cord of the coating sheet after rubber coating is detected by an eddy sensor and the like and concurrently the position of the end surface of the selvage rubber portion is detected by the other detecting means to determine the width of the selvage rubber portion. But, in the former measuring method, there is a defect that before or after the rubber coating, if the position of the most externally positioned cord is varied during rubber coating in order to detect the position of the most externally positioned cord and the end surface of the selvage rubber portion, it is impossible to precisely measure the width of the selvage rubber portion. In the latter measuring method, the positions of the most externally positioned cord and the end surface of the selvage rubber portion are concurrently detected after rubber coating to determine the width of the selvage rubber portion, so that the width of the selvage rubber portion can be always precisely measured. However, when the cord comprises organic fibers, such as nylon and the like, this method is not applicable, so that this method cannot be ordinarily used.

SUMMARY OF THE INVENTION

An object of the present invention is to provide a method and an apparatus for measuring the width of the selvage rubber portion of the coating sheet by which the above described various defects are obviated and the width of the selvage rubber portion can be always precisely measured in the case where the cord is not only steel but also organic fibers.

The present invention in its method is intended for measuring a width of a selvage rubber portion extending in transversal direction of a coating sheet in which a plurality of cords arranged in substantially equal intervals and in parallel are integrally coated with rubber and the like so that the cord portions are expanded, from the most externally positioned cord portion of said coating sheet, which is characterized in that light is emitted on a zone including at least a transferring member, the surface on which has a reflecting property different from that of the above described coating sheet, and the most externally positioned cord portion while transferring the coating sheet on the surface of the transferring member in the longitudinal direction of said cords and the intensity distribution of the reflected light is detected with a photo-detector. The width of the selvage rubber portion extending from the most externally positioned cord in the transversal direction of the sheet is substantially continuously measured.

The apparatus for measuring the width of the selvage rubber portion of the coating sheet according to the present invention comprises a roller having a scattering surface for transferring a coating sheet in which a plurality of cords are arranged in substantially equal intervals and in parallel are integrally coated with rubber so that the cord portions are expanded, on the scattering surface in the longitudinal direction of the cord, a light source from which a light is emitted on a zone including at least the transferring roller and the most externally positioned cord portion of the coating sheet in an inclined direction to an axial line direction of the transferring roller in a plane including the axial line of the roller, and a photo-detector which is provided with light receiving element array arranged in the above described plane near the above described transferring roller, and receives and scans the light which is emitted from the above described light source and is reflected by the above described transferring roller and the coating sheet. It is constructed to continuously measure the width of the selvage rubber portion extending from the most externally positioned cord in the above described coating sheet in the transversal direction of the sheet based on the intensity distribution of the reflected light detected in the photo-detector.

DESCRIPTION OF THE PREFERRED EMBODIMENTS

Figure 1:
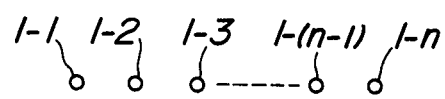
FIG. 1 is a cross-sectional view showing the arrangement of a plurality of cords for forming a coating sheet.
Figure 2:
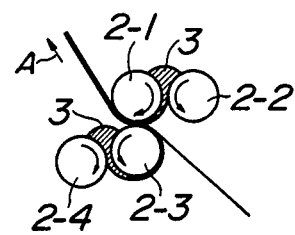
FIG. 2 is a schematic view showing the step for forming a coating sheet by coating the plurality of cords shown in FIG. 1 with rubber through a calender.
Figure 3:
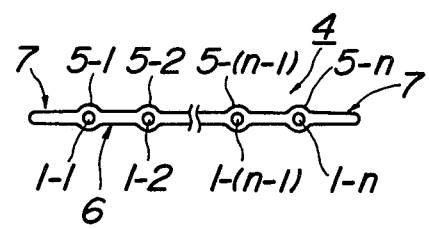
FIG. 3 is a cross-sectional view in the transversal direction of the coating sheet.
Figure 4:
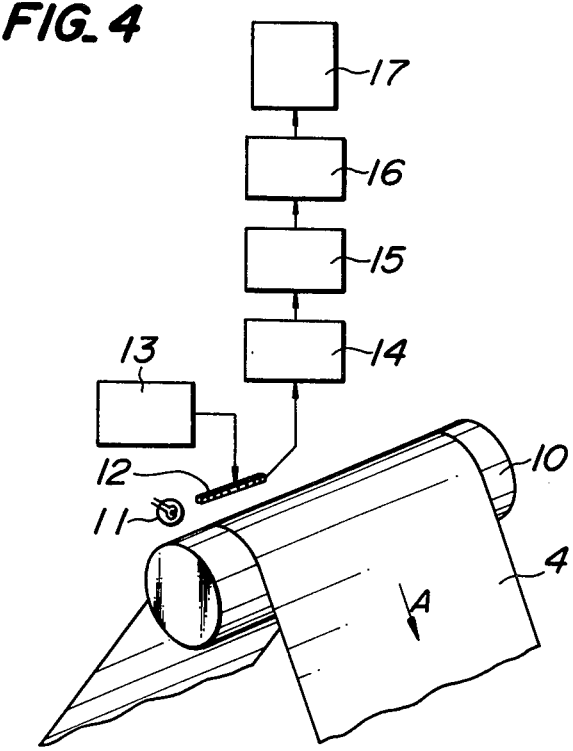
FIG. 4 is a diagrammatic view showing the construction of one embodiment of apparatus for measuring the width of the selvage rubber portion of the coating sheet according to the present invention.

FIG. 4 is a diagrammatic view showing the construction of one embodiment of apparatus according to the present invention. In this example, a coating sheet 4 coated with rubber so as to expand the cord portions as shown in FIG. 3 is transferred by a roller 10 provided with a scattering surface in the longitudinal direction of the sheet shown by an arrow A. A substantially parallel light is emitted from a light source 11 composed of halogen lamp and the like in inclined direction to the axial line direction in a plane including the axial line of the transferring roller 10 to a zone including the most externally positioned cord portion of the coating sheet and the transferring roller. On the transferring roller the intensity distribution of light reflected by said roller 10 and the coating sheet 4 is detected by a photo-detector 12. The photo-detector 12, is made of a light receiving element array of self-scanning and charge-storing type devices, such as CCD (Charge Coupled Device), BBD (Bucket Brigade Device) and the like and in this example, this photo-detector 12 is arranged so that the light reflected by the cord portion in the coating sheet 4 is made incident upon the light receiving surface perpendicularly thereto in the plane including the axial line of the transferring roller 10. Therefore, an angle formed by the light emitted from the light source 11 and a plane perpendicularly crossed to the axial line of the transferring roller 10, that is an incident angle at the flat portion in the coating sheet 4 is set within a range of 30°–80°, preferably 50°–70°.

The photo-detector 12 is scanned by a driving circuit 13 in an appropriate timing and an analog output of one line of the photo-detector is successively supplied to a comparing circuit 15 through an analog buffer amplifier 14. The comparing circuit 15 compares successively the successive analog output of one line from the photo-detector 12 with the given level and converts the analog output into a bivalent signal, which is supplied to a binary code converting circuit 16. The binary code converting circuit 16 generates a digital signal showing the position of the light receiving elements of the photo-detector 12 depending upon the bivalent signal successively supplied from the comparing circuit 15 and the digital signal is supplied to a calculating circuit 17. The calculating circuit 17 effects the predetermined calculation based on the digital signal supplied from the binary code converting circuit 16 to determine the width of the selvage rubber portion.

Figure 5A:
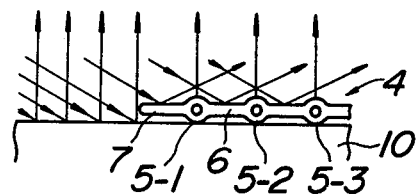
FIG. 5, A and B are diagrammatic views showing the distribution of the light reflected by the coating sheet and the transferring roller in the measuring apparatus shown in FIG. 4 and the intensity distribution of the reflected light detected by the photo-detector respectively.
Figure 5B:
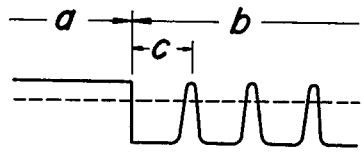

In the example shown in FIG. 4, the light reflected by the transferring roller 10 and the coating sheet 4 is as shown in FIG. 5, A and in this case the intensity distribution of the reflected light detected by the photo-detector 12 is as shown in FIG. 5, B. That is, the light receiving elements positioned at a zone a are arranged to receive the scattering light from the transferring roller 10 and the light receiving elements positioning at a zone b are arranged so as to receive the light reflected by the cord portions 5-1, 5-2, . . . , so that the intensity of the incident light to the light receiving elements corresponding to the position of the cord portions 5-1, 5-2, . . . is higher than the intensity of the incident light to the light receiving elements corresponding to the position of the flat portions 6 and the selvage rubber portion 7 and is substantially equal to the intensity of the incident light to the light receiving elements corresponding to the position of the transferring roller 10. Accordingly, the output of the light intensity distribution from the photo-detector 12 as shown in FIG. 5B is compared with the predetermined level shown by a broken line in the comparing circuit 15 and converted into a bivalent signal and the digital signal showing the position of the light receiving elements of "H" level of the bivalent signal is generated in the binary code converting circuit 16 and supplied to the calculating circuit 17. In this manner, the distance of the zone c corresponding to the selvage rubber portion 7, that is the width of the selvage rubber portion can be always precisely measured in this calculating circuit 17.

The present invention is not limited to the above described example and a number of variations or modifications are feasible. For example, in the above described example, the coating sheet 4 is transferred by the roller 10 provided with a scattering surface, but a belt conveyor provided with a scattering surface may be used instead of the transferring roller 10. Alternatively, a fixed guide member having a scattering surface is provided and the coating sheet 4 may be transferred on the guide member surface while sliding thereon. Furthermore, the surface of the above described transferring roller 10, the belt conveyor or the guide member is not necessarily required to be a scattering surface and such surfaces may be constructed so as to have a reflecting property different from the reflecting property of the coating sheet 4 so that the output of the light receiving elements corresponding to these portions can be distinguished from the output of the light receiving elements corresponding to the cord portions 5-1, 5-2, . . . , the flat portions 6 and the selvage rubber portion 7. The light source 11, may be made of various light sources emitting ultraviolet, infrared and the like corresponding to the sensitivity of the used photo-detector 12 as well as visible light. In addition, the light emitted from the light source 11 is passed through a collimator lens to obtain a parallel light flux and then emitted on a given zone. In the above described example, the photo-detector 12 was arranged so that the light reflected by the cord portions 5-1, 5-2, . . . is made incident upon the light receiving surface of the photo-detector 12 perpendicularly thereto but even if the photo-detector 12 is arranged so that the light reflected by the flat portions 6 and the selvage rubber portion 7 in the coating sheet 4 is received, the selvage rubber portion can be similarly measured. In FIG. 4, the width of one side of selvage rubber portion in the coating sheet 4 is measured but the width of another side of selvage rubber portion may be similarly measured and in this case, the light source 11 is positioned at substantially the central upper portion of the coating sheet 4. Furthermore, the photo-detector 12 is not limited to the charge-storing type of CCD and BBD but may be constructed by using photo-transistor.

As explained above in detail, the present invention relates to portions where the cords are coated with rubber form the expanded portions and it is intended to optically measure the width of the selvage rubber portion from the intensity distribution of the light reflected by the most externally positioned cord portion, the selvage rubber portion and the transferring member, so that even when the cord is organic fibers as well as steel, the selvage rubber portion can be always precisely measured. Thus, when the coating sheet is used for the production of tire, the selvage rubber can be easily cut so as to obtain the desired width of the selvage rubber portion based on the measured width of the selvage rubber portion, so that it is possible to produce tires which are high in the drive feeling and are strong and safe, and have high quality.

What is claimed is:

1. A method for measuring a width of a selvage rubber portion of a rubber coated sheet in which a plurality of reinforcing cords are arranged in substantially the equal interval and in parallel and integrally coated with rubber so that the cord portions form expanded portions in said rubber coated sheet, said selvage rubber portion extending in a transversal direction of the rubber coated sheet from the most externally positioned cord portion, comprising the steps of;

transferring said rubber coated sheet on a scattering surface of a transferring roller whose reflecting property is different from the reflecting property of said rubber coated sheet, in the longitudinal direction of said cord, projecting light onto a zone including a part of the transferring roller, the selvage rubber portion and the most externally positioned cord portion in an inclined direction with respect to an axial line direction of the transferring roller, receiving light reflected by said zone by means of a photodetector having a light receiving element array arranged in parallel with the axial line direction of the transferring roller in such a manner that an amount of light scattered by the surface of the transferring roller is substantially equal to an amount of light reflected normally by said cord portion to produce an output signal representing a light intensity distribution of the light reflected by said zone, comparing said output signal with a predetermined level to generate a bivalent signal, and measuring the width of the above described selvage rubber portion on the basis of said bivalent signal.

2. The method of claim 1 wherein said light is projected at an inclined angle of 30°–80°.

3. An apparatus for measuring a width of a selvage rubber portion of a rubber coated sheet in which a plurality of reinforcing cords are arranged in substantially the equal interval and in parallel and integrally coated with rubber so that the cord portions form expanded portions in said rubber coated sheet, said selvage rubber portion being extended in transversal direction of the rubber coated sheet from the most externally position cord portion, comprising;

a roller having a scattering surface for transferring said coated sheet on said surface in the longitudinal direction of the cord;

a light source from which a light is emitted on a zone including a part of the transferring roller, the selvage rubber portion and the most externally positioned cord portion of the rubber coated sheet in a direction inclined to an axial line direction of the roller in a plane including the axial line of said roller;

a photodetector provided with a light receiving element array arranged in parallel with the axial line of the roller, said light receiving array receiving and scanning the light which is emitted from said light source and reflected by the roller and the rubber coated sheet in such a manner that an amount of light reflected by the scattering surface of the roller is substantially equal to an amount of light reflected regularly by the cord portion of the rubber coated sheet to produce an output signal representing a light distribution of the light reflected by said zone;

a comparing circuit for comparing said output signal with a predetermined level to produce a bivalent signal;

a binary code converting circuit for converting said bivalent signal into a digital signal representing positions of edges of the bivalent signal; and a calculating circuit for calculating the width of the above described selvage rubber portion based on said digital signal.

4. The apparatus of claim 3 wherein said light receiving element array comprises an array of charge coupled devices and, means to scan said array of charge coupled devices.

5. The apparatus of claim 3 wherein said light source is inclined to the axial line of said roller in a range of 30°–80°.

6. The apparatus of claim 3 further comprising a buffer amplifier receiving an analog output representative of one line of scanning of said photodetector and successively applying said analog output to said comparing circuit.

* * * * *